Patented July 12, 1938

2,123,653

UNITED STATES PATENT OFFICE 2,123,653

PROCESS FOR THE MANUFACTURE OF ETHERS OF 2-METHYL-3-CHLORO-TETRAHYDROFURANE

Max Klingenfuss, Basel, Switzerland, assignor to Hoffmann-La Roche, Inc., Nutley, N. J., a corporation of New Jersey No Drawing. Application December 15, 1937, Serial No. 180,024. In Switzerland July 20, 1937

6 Claims. (Cl. 260—54)

Ethers of 2-methyl-2-hydroxy-3-chloro-tetrahydrofurane of the general formula

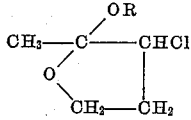

wherein R represents alkyl, are so far not known. It could not be anticipated that such compounds would be stable or even capable of existence, because the corresponding 2-hydroxy-tetrahydrofuranes are actually δ-hydroxyketones (Journal of the American Chemical Society 58, 1936, page 1804) consequently their ethers are keto-acetals which are known to be easily liable to decomposition.

It has now been found that ethers of 2-methyl-2-hydroxy-3-chloro-tetrahydrofurane can be obtained by treating aceto-chloro-butyrolactone at moderate temperature with sulphuric acid in the presence of an aliphatic primary alcohol.

The action of mineral acid on aceto-chloro-butyrolactone under different conditions is well-known (Journal of the American Chemical Society 58, 1936, page 1804; Chemisches Zentralblatt 1934, II., page 2381). The result obtained by the present process is absolutely different and surprising.

The new process is also characterized in that it is not immaterial which mineral acid is used. With sulphuric acid only are satisfactory results obtained; furthermore, the temperature at which the action of the acid and the alcohol takes place is of great importance. At a low temperature the reaction only proceeds very slowly; at high temperatures higher boiling by-products are produced in increasing amounts. The reaction is preferably carried out at 40–50° C.

The ethers of 2-methyl-2-hydroxy-3-chloro-tetrahydrofurane are stable, well characterized compounds. They are colourless liquids which distill under reduced pressure without decomposition. Their boiling-point is low. They do not react with ketone-reagents such as, for instance, semicarbazide. The chlorine-atom is reactive.

The new compounds are to be used as intermediate products for the manufacture of pharmaceutical preparations.

Example 1

100 parts by weight of α-aceto-α-chloro-butyrolactone, 120 parts by weight of 80 per cent. ethyl-alcohol and 36 parts by weight of concentrated sulphuric acid are stirred together at 40–50° C. until the evolution of carbon-dioxide has ceased. After cooling the product is taken up in ether, washed first with water, then with sodium-carbonate solution so as to render the product acid-free, and the ethereal solution then fractionally distilled. From the fraction boiling at 50–70° C. at a pressure of 13 mm, 2-methyl-2-ethoxy-3-chloro-tetrahydrofurane is obtained on redistillation as a colourless liquid boiling at 56–58° at a pressure of 13 mm. The compound is difficultly soluble in water, easily soluble in organic solvents. The yield is 70% of the theoretical.

Example 2

100 parts by weight of aceto-chloro-butyrolactone, 90 parts by weight of methanol and 55 parts by weight of 48 per cent. sulphuric acid are heated at 40–50° C. until no more carbon-dioxide is evolved. The working-up is effected in accordance with Example 1, whereby 2-methyl-2-methoxy-3-chloro-tetrahydrofurane is obtained as a colourless, mobile liquid boiling at 53–54° C. at a pressure of 13 mm. Its properties resemble to a great extent the product of Example 1. The yield is 52%.

Example 3

80 parts by weight of aceto-chloro-butyrolactone and 70 parts by weight of n-butanol are stirred with 15 parts by weight of water and 27 parts by weight of concentrated sulphuric acid at 40–50° C. until the carbon-dioxide evolution which is at first vigorous has ceased. When the working-up is carried out as described in the previous examples, the 2-methyl-2-butoxy-3-chloro-tetrahydrofurane is obtained as a colourless liquid boiling at 88–90° C. under a pressure of 13 mm. The compound is difficultly soluble in water, easily soluble in organic solvents. The yield amounts to 43%.

I claim:

1. The lower alkyl ethers of 2-methyl-2-hydroxy-3-chloro-tetrahydrofurane.
2. The 2-methyl-2-methoxy-3-chloro-tetrahydrofurane.
3. The 2-methyl-2-ethoxy-3-chloro-tetrahydrofurane.
4. Process for the manufacture of ethers of 2-methyl-2-hydroxy-3-chloro-tetrahydrofurane which comprises reacting an aliphatic primary alcohol with aceto-chloro-butyrolactone in the presence of sulphuric acid at a moderate temperature.
5. Process for the manufacture of 2-methyl-2-methoxy-3-chloro-tetrahydrofurane which comprises reacting methanol with aceto-chloro-butyrolactone in the presence of sulphuric acid at a moderate temperature.
6. Process for the manufacture of 2-methyl-2-ethoxy-3-chloro-tetrahydrofurane which comprises reacting ethyl-alcohol with aceto-chloro-butyrolactone in the presence of sulphuric acid at a moderate temperature.

MAX KLINGENFUSS.